United States Patent [19]

Berlemont

[11] Patent Number: 4,600,639
[45] Date of Patent: Jul. 15, 1986

[54] ELASTIC FLOOR COVERING AND PROCESS FOR MAKING SAME

[75] Inventor: Jacques Berlemont, Paris, France

[73] Assignee: Etablissements Boulenger, France

[21] Appl. No.: 582,080

[22] Filed: Feb. 21, 1984

[30] Foreign Application Priority Data

Feb. 21, 1983 [FR] France .................. 83 02762

[51] Int. Cl.⁴ ............................................. B32B 5/16
[52] U.S. Cl. ................................. 428/327; 428/411; 428/493; 427/385.5
[58] Field of Search .............. 428/327, 411, 493; 427/385.5

[56] References Cited

U.S. PATENT DOCUMENTS 3,801,421  4/1974  Allen et al. .................. 428/17
3,869,421  3/1975  Sapp et al. ................... 428/331
3,984,607  10/1976  Thoma et al. ................. 525/130

Primary Examiner—Edith Buffalow
Attorney, Agent, or Firm—Lerner, David, Littenberg, Krumholz & Mentlik

[57] ABSTRACT

The present invention relates to an elastic floor covering based on granules inserted in a binding agent. According to the invention, this covering is applied in two layers, the second being obtained by mixing, in given proportions, the binding agent, a powder of the same composition as the said granules, a solvent and a plasticizer. The invention finds advantageous application in the domain of building and construction, particularly for school rooms, sports stadiums, workshops, nurseries, etc.

6 Claims, 2 Drawing Figures

ELASTIC FLOOR COVERING AND PROCESS FOR MAKING SAME

The present invention relates to a floor covering, particularly an elastic one, intended more especially for school rooms, sports stadiums, workshops, nurseries, etc.

Floor coverings are known, which are based on granules inserted in a binding agent, made directly in situ on the support to be treated, which are applied in accordance with the "rule" technique, i.e. using shims on which a rule is slid in order to obtain the desired thickness. The granules used are, in particular, granules of natural or synthetic rubber, or of plastic. The binding agent used is in particular a mono-component polyurethane resin adapted to the hardness of the granules chosen.

In this type of covering, once the mixture of granule/binding agent has been applied, it is necessary to effect sanding for equalization. Such sanding reveals holes which must be filled with a mastic. The problem posed is that of finding a mastic which is sufficiently fluid to penetrate between the granules and thus to adhere correctly to the covering, but at the same time sufficiently viscous in order not to continue to flow through the covering and then no longer fill the holes on the top surface of said covering.

To provide a solution to this problem, the invention relates to an elastic floor covering constituted by a first layer constituted by granules of natural or synthetic rubber material or of plastics material disposed in a hardenable binding agent and by a second finishing layer comprising, in a binding agent indentical to that of the first layer to which a solvent and a plasticizer have been added, a solid filler constituted by a powder of material identical to that of the said granules.

A further object of the invention is a process for advantageously making the above covering, whereby the said first layer is made then sanded after it has hardened, the product of sanding being recovered and incorporated as filler in the resin used for the second layer, and the composition thus obtained is applied on said first layer.

The invention will be more readily understood on reading the following description with reference to the accompanying drawings, in which.

Figure 1:
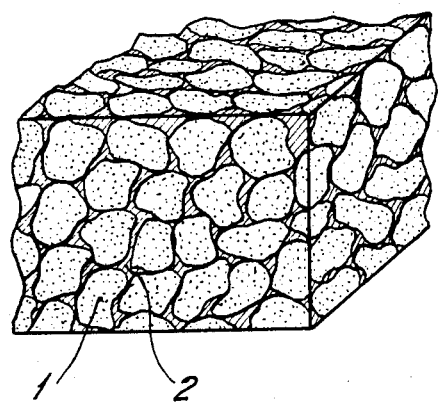
FIG. 1 shows the base layer of the floor covering according to the invention.
Figure 2:
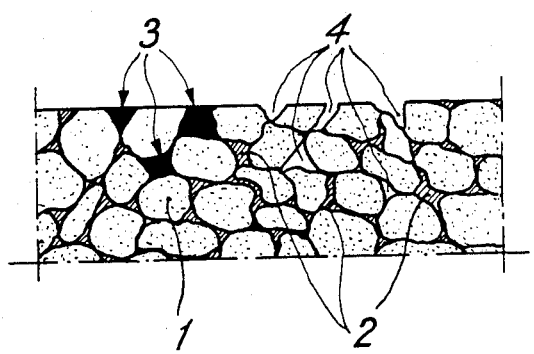
FIG. 2 shows in detail and on a larger scale a surface zone of FIG. 1 after the finishing layer has been applied and sanded.

Referring now to the drawings, the base layer is made in known manner by granules of rubber 1 inserted in a polyurethane resin 2 which has hardened. A composition or a mastic consisting of a mixture of polyurethane resin, of powder of the same material as the granules of the covering, of plasticizer (for example octyl phthalate) and of solvent (for example methylethylketone) is then constituted. The mastic 3 thus prepared will be applied with the aid of a scraper on the covering, and will fill any holes 4 which exist. After it has hardened, this mastic will constitute the finishing layer mentioned above.

The interest of the solvent, apart from regulating the fluidity of the mastic, avoids "bubbling", i.e. the formation of bubbles on the surface of the mastic. In fact, polymerisation of the prepolymer constituting the resin is accompanied by a release of carbon dioxide gas $CO_2$, which must be able to escape without being included, otherwise bubbles appear.

The plasticizer also enables the viscosity of the mastic to be regulated.

According to an advantageous embodiment of the invention, the mixture used for making the mastic comprises, by weight, for 100 parts of resin, 60 parts of solvent and plasticizer and 70 parts of powder in the case of coarse-grained coverings, and comprises 27 parts of plasticizer and solvent, for 35 parts of powder in the case of fine-grained coverings.

According to another embodiment of the invention, the mastic intended for coating a covering composed of granules of plastic inserted in a resin, will be obtained by mixing resin, powder coming from a plastics material similar to that of the granules, plasticizer and solvent, the resin, plasticizer and solvent being adapted to the nature of the plastics material.

After application of the mastic, the latter will advantageously be sanded with the aid of a band sander, which enables the surplus mastic covering the grains to be easily removed.

In the same way as the coverings in question may present various colours by using granules of different colours, the mastic may also offer several shades. By making it with the powder resulting from sanding the covering to be cemented, the mastic will be in the same shade as the covering. However, it may also be in a different shade by using powders coming in particular from the operations of granulation necessary for making the coverings themselves, and which offer a whole range of colours.

According to the invention, the final shade of the elastic covering will be stronger than that obtained by the granules, and its appearance will be more shiny if a dye is incorporated during manufacture of the mastic.

In the particular case of elastic floor coverings in workshops, where a resistance to solvents, oils and gasoline is necessary, an epoxy resin will be used for making the mastic, instead of polyurethane resin. Another particular case prohibits the use of solvents. The mono-component polyurethane resin will in that case be replaced either by a bi-component resin (isocyanate and polyol and/or polyester) or by a resin in emulsion.

A particularly advantageous process for making the covering according to the invention resides in that, after having made the first layer mentioned above, it is sanded and the product of sanding obtained which is a powder of rubber and of hardened resin is collected and incorporated, in the above-mentioned proportions, in the resin prepared for the second layer. This product of sanding will have been sieved previously in order to obtain a granulometry of the powder such that the dimensions of the particles to be incorporated are not greater than 0.45 mm. This process enables floor coverings to be made economically, by eliminating the storage and transport of the powder necessary for the second composition.

The invention finds advantageous application in the domain of building and construction.

What is claimed is:

1. An elastic floor covering comprising a first layer of a hardenable composition having a polyurethane resin binding agent having a granular material interspersed therein, said granular material being a synthetic rubber, a natural rubber, or a synthetic plastic, and a finishing layer comprising a polyurethane resin binding agent, a solvent, a plasticizer, and a powder wherein said powder is a sanding product of said first layer after hardening.

2. The covering of claim 1 wherein said plasticizer is octyl phthalate and said solvent is methylethylketone.

3. The covering of claims 1 or 2 wherein said finishing layer comprises by weight 100 parts of a resin binding agent, approximately 60 parts of plasticizer and a solvent, and approximately 70 parts of powder.

4. The covering of claims 1 or 2 wherein said finishing layer comprises by weight 100 parts of a resin binding agent, approximately 27 parts of plasticizer and solvent, and approximately 35 parts of said powder.

5. The covering of claim 4 wherein said sanding product is sieved.

6. The covering of claim 1 wherein said powder is approximately 45 milliliters in size.

* * * * *